United States Patent [19]

Peracchio et al.

[11] Patent Number: 5,370,156
[45] Date of Patent: Dec. 6, 1994

[54] REDUCED NOISE VALVE STOP

[76] Inventors: Aldo A. Peracchio, 102 Fairview Dr., South Windsor, Conn. 06074; Mark E. Marler, 47 Northwoods La., Middletown, Conn. 06457; Keshava B. Kumar, 5100 Highbridge St., Apt. 31E, Fayetteville, N.Y. 13066

[21] Appl. No.: 155,501

[22] Filed: Nov. 22, 1993

[51] Int. Cl.5 .............................. F16K 15/16
[52] U.S. Cl. .................... 137/856; 137/855
[58] Field of Search ............. 137/527, 855, 856

[56] References Cited

U.S. PATENT DOCUMENTS

| | | | |
|---|---|---|---|
| 1,029,726 | 6/1912 | Sprado | 137/856 X |
| 1,480,608 | 1/1924 | Gardner | 137/856 |
| 3,200,838 | 8/1965 | Sheaffer | 137/856 X |
| 4,901,760 | 2/1990 | Nagashima | 137/856 X |
| 5,016,669 | 5/1991 | Jamieson | 137/856 X |

Primary Examiner—John Rivell

[57] ABSTRACT

The profile of the valve stop of a discharge valve is configured such that the portion facing the free length of the valve member has an increasing radius portion and a decreasing radius portion.

3 Claims, 2 Drawing Sheets

REDUCED NOISE VALVE STOP

BACKGROUND OF THE INVENTION

In positive displacement compressors employing valves, the valve members may cycle hundreds of times per minute. Valve stops are commonly employed to protect the valve member from being overstressed by limiting movement of the valve member. For example, under liquid slugging conditions, the mass flow during a cycle is such that the valve member would be excessively displaced if a valve stop was not present. Engagement of the valve stop by the valve member can be a significant source of noise. Specifically, a discharge valve stop in a rolling piston rotary compressor has been identified as one of the major noise sources through the impact kinetic energy transmission of a discharge valve member. The impact between the valve and valve stop generates significant noise radiation at the natural frequency of the valve stop due to transmission of valve kinetic energy to the valve stop and the compressor shell, where the valve stop is excited at its natural frequency.

SUMMARY OF THE INVENTION

A discharge valve stop in a rotary compressor has been identified as a major noise source through the impact kinetic energy transmission of a discharge valve. A primary reason for the intensity of the noise in conventional valve stop designs is that the tip of the valve member impacts the valve stop before the root does and because total valve/valve stop contact occurs, typically, during the last tenth of a millisecond of a one millisecond opening stroke. To reduce impact between the valve member and the valve stop, a profile is employed such that the initial impact occurs at a time when only a small amount of kinetic energy has been developed in the valve member and continues through the opening stroke of the valve member such that contact progresses from the root through the middle to the head of the valve member. This produces a rolling contact with a continuous contact between the valve member and stop as the valve member wraps around the stop. A smooth and gradual contact with a longer time interval transmits less spectrum rich energy and produces a smaller valve stop deflection than a short time high velocity impact.

It is an object of this invention to reduce sound radiation in a positive displacement compressor.

It is an additional object of this invention to avoid exciting the natural frequency of a member producing a pure tone at a given frequency.

It is another object of this invention to have valve impact with the valve stop occur over the entire opening stroke of the valve member.

It is a further object of this invention to minimize the kinetic energy transferred to the valve stop by the valve member and to maximize the time taken to transfer a given amount of kinetic energy to the valve stop. These objects, and others as will become apparent hereinafter, are accomplished by the present invention.

Basically, the valve stop is designed in such a way that contact between the valve member and valve stop takes place over the entire opening stroke of the valve member and contact progresses from the root through the middle to the head of the valve member.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENT

Figure 1:
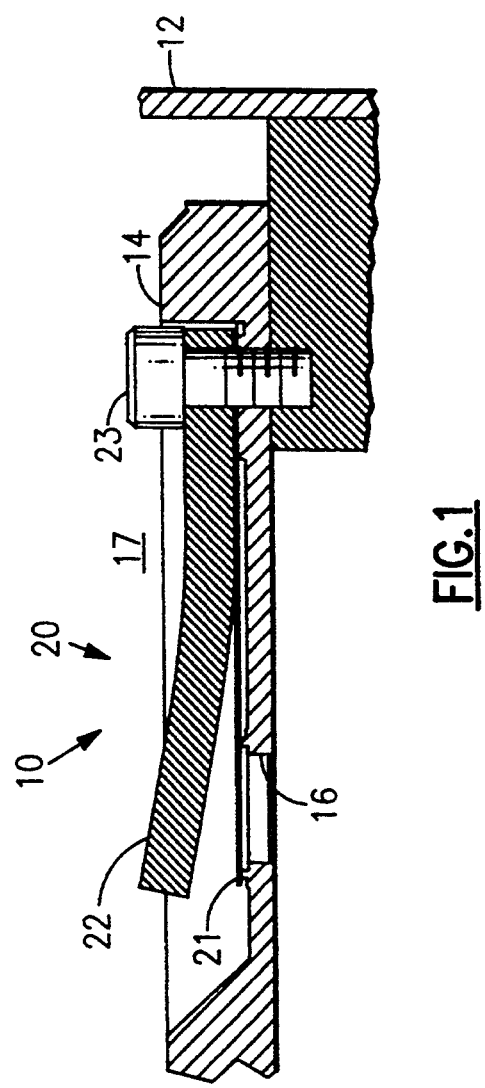
FIG. 1 is a sectional view of a discharge valve incorporating the present invention.

In FIG. 1, the numeral 10 generally designates a high side, positive displacement, hermetic compressor having a shell 12. Discharge port 16 is formed in member 14 which would be the motor side bearing end cap in the case of a fixed vane or rolling piston compressor. Also in the case of a fixed vane or rolling rotor compressor, discharge port 16 will open into a muffler to attenuate pulsations prior to flowing into the interior of shell 12. Discharge port 16 is controlled by valve assembly 20 which includes valve member 21, valve stop 22 and bolt or other fastening member 23 for securing valve member 21 and valve stop 22 to member 14.

In operation, when the pressure at discharge port 16 exceeds the pressure in chamber 17 adjacent to valve assembly 20, valve member 21 opens, by deforming or flexing, to permit flow through discharge port 16 into chamber 17. In the absence of valve stop 22, the valve member 21 would flex to a curved configuration during the discharge stroke and seat on discharge port 16 during the suction stroke. The valve stop 22 is only present to prevent excessive flexure of valve member 21, such as would happen during liquid slugging conditions, which would permanently deform the valve member 21. Accordingly, current designs have the valve member 21 impacting the valve stop 22 during normal operation with resultant noise. This is primarily due to the fact that the valve tip strikes the valve stop first and that impact takes place over a small percentage of the discharge stroke. The present invention configures the valve stop 22 to a shape such that impact occurs over a much larger portion of the discharge stroke with contact progressing from the root through the middle to the head of the valve member 21 as the valve member 21 wraps around the valve stop 22.

Valve member 21 is very thin, typically on the order of 0.4 mm, in its bending direction so the shear stress contribution to the resultant maximum principal stress can be neglected. It is assumed that the stop 22 is very thick as compared with the thickness of the valve member 21 so that the valve member 21 can be considered to be clamped at the root of the stop similar to a cantilever beam. It is also assumed that the force applied on the valve head is taken as applied at the tip of a cantilever beam which corresponds to the head center of the valve member 21.

Figure 2:
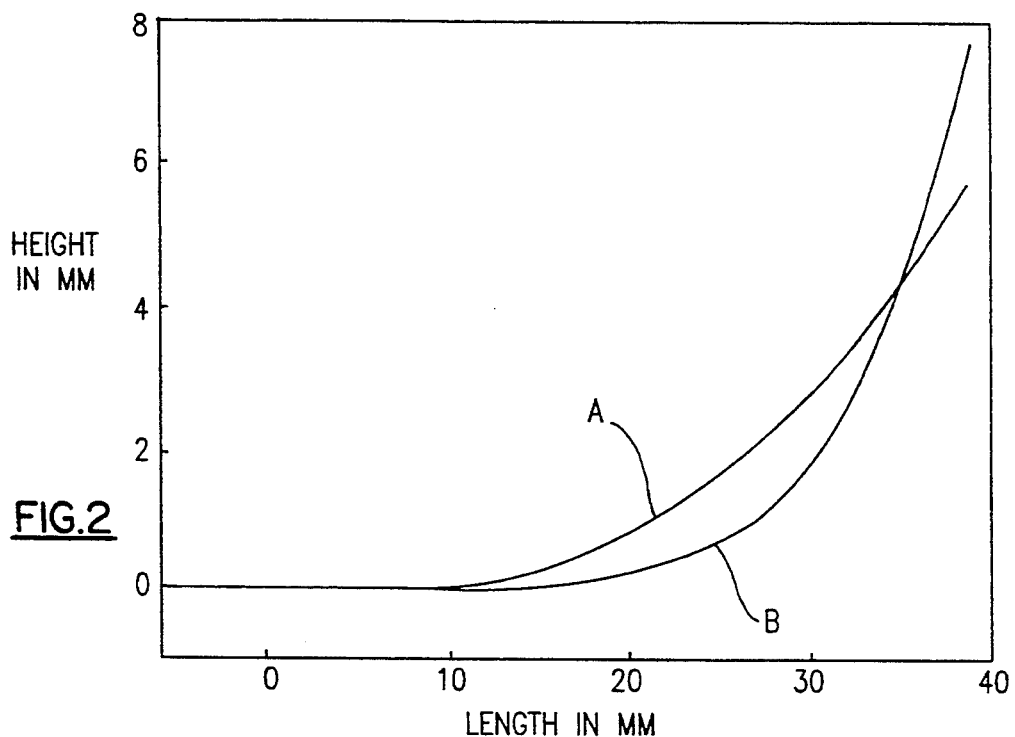
FIG. 2 is a comparison of the profiles of the valve stop of the present invention and a conventional constant radius profile.
Figure 3:
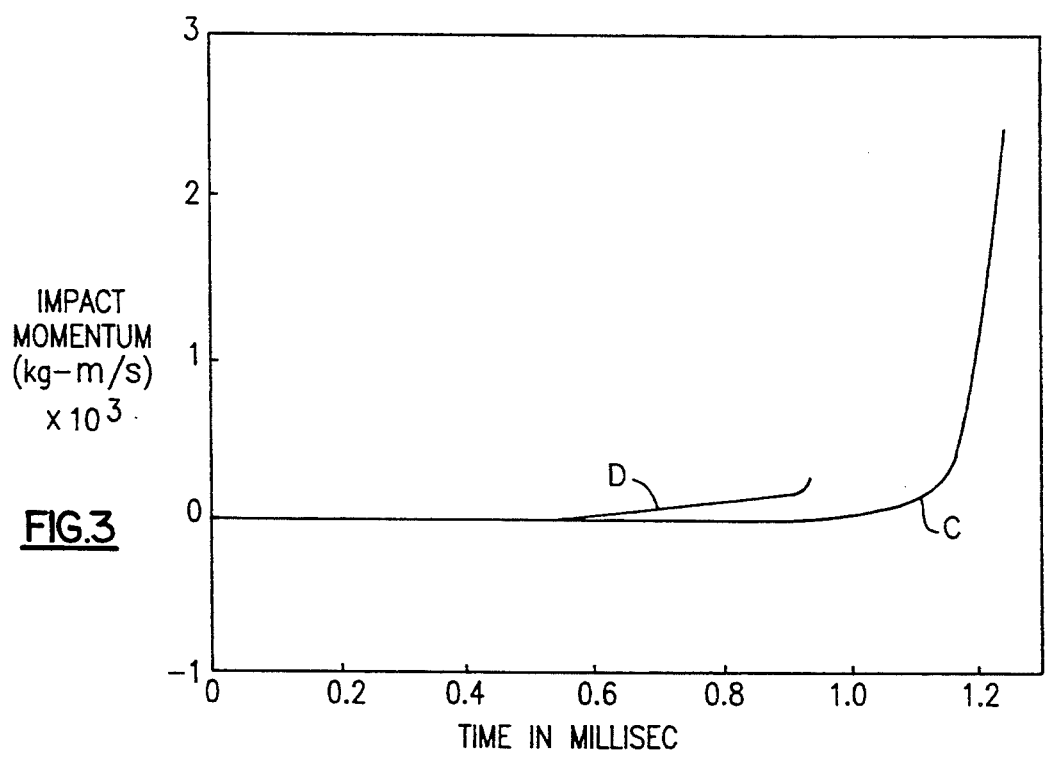
FIG. 3 is a plot of impact momentum vs. time for the profiles of FIG. 2.

Turning now to FIG. 2, curve A designates a standard fixed radius stop profile, specifically a 38 mm radius, and curve B designates the profile of the present invention. As illustrated, the stop profiles represent a valve member having a free length of approximately 27 mm and a clamped length of approximately 10 mm. For the free length portion of curve B, relative to curve A, there is an increasing radius portion and a decreasing radius portion with the transition coming at a free length of approximately 17 mm. Comparing curves A and B it will be noted that the curves do not intersect until a free length of approximately 24 mm. It follows, that as compared to a standard constant radius stop profile the present invention has a lesser height for approximately 90% of the free length and a greater height for approximately the last 10% of the free length. The sharper curvature of curve B occurring at a greater free length has the effect of increasing the time it takes for the valve member 21 to complete the contact process with stop 22, and results in less of the valve member 21 making impact, thereby reducing the transferred momentum. The combination of increased contact time and reduced transferred momentum greatly suppresses the valve-valve stop vibration and radiated noise. Since in the constant radius profile of curve A, the initial valve member impact is at the tip, the profile of curve B raises the portion of the stop 22 facing the free end to delay its contact and lowers the portion of the stop facing the portion of the valve member 21 extending from the root thereby hastening contact of the valve member 21 with stop 22. Initial contact starts at the root and progresses towards the tip of valve member 21 as valve member 21 wraps around stop 22. Since contact of the valve member with the stop defines the fulcrum, opening results in a constantly reducing free length which defines the valve member response which varies with the free length. Referring now to FIG. 3, curves C and D correspond to curves A and B, respectively, and represent momentum vs. time from a finite element analysis of valve member impact with the valve stop. Curve C represents the initial impact by the valve member tip which takes place late in the opening stroke, over a short time period, and with high kinetic energy as clearly shown by curve C. In contrast, curve D shows impact starting earlier, and therefore at less kinetic energy, and continuing for a longer period but at a much reduced impact momentum which translates into less noise generation.

Although a preferred embodiment of the present invention has been described and illustrated, other changes will occur to those skilled in the art. It is therefore intended that the scope of the present invention is to be limited only by the scope of the appended claims.

What is claimed is:

1. A discharge valve assembly including a valve stop and a valve member having a tip and a root with a free length therebetween and said valve stop having a profile starting at said root and having a first portion which is of an increasing radius and which transitions into a second portion which is of a decreasing radius such that said second portion has a radius less than said first portion at a point generally corresponding to 90% of said free length.

2. A discharge valve assembly including a valve stop having a natural frequency and a valve member movable into engagement with said stop and having a tip and a root with a free length therebetween and said valve stop having a profile starting at said root and having a first portion which is of an increasing radius and which transitions into a second portion which is of a decreasing radius such that said second portion has a radius less than said first portion at a point generally corresponding to 90% of said free length whereby engagement between said valve member and said stop takes place over essentially an entire opening movement of said valve member thereby maximizing the duration of, and minimizing the amount of, kinetic energy transfer from said valve member to said stop.

3. The valve assembly of claim 2 wherein said engagement avoids exciting said natural frequency.

* * * * *